(12) United States Patent
Syrowik et al.

(10) Patent No.: US 7,144,079 B2
(45) Date of Patent: Dec. 5, 2006

(54) TAILGATE SEAT ASSEMBLY

(75) Inventors: Glenn F Syrowik, Ortonville, MI (US);
Alan R Mackey, South Lyon, MI (US);
Catherine A DeVoss, Plymouth, MI
(US); Lei Cao, Farmington Hills, MI
(US); Matthew R Abate, South Lyon,
MI (US); Ravi Hosalli, Troy, MI (US);
Ronald J Kaip, Sterling Heights, MI
(US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 11/056,374

(22) Filed: Feb. 10, 2005

(65) Prior Publication Data

US 2006/0175876 A1    Aug. 10, 2006

(51) Int. Cl.
*B60N 2/02* (2006.01)

(52) U.S. Cl. .......................... 297/92; 297/94; 297/100; 297/283.2

(58) Field of Classification Search ............ 297/92–94, 297/100, 283.2 X, 1
See application file for complete search history.

(56) References Cited

U.S. PATENT DOCUMENTS

| 2,828,806 | A | * | 4/1958 | Saffer .................... 297/378.12 |
| 2,858,880 | A | * | 11/1958 | Fox ............................ 297/93 |
| 3,743,350 | A | * | 7/1973 | Allen ......................... 297/94 |
| 4,168,860 | A | * | 9/1979 | Garza et al. ................ 297/92 |
| 5,098,154 | A | * | 3/1992 | Emery ........................ 297/92 |
| 6,474,741 | B1 | * | 11/2002 | Kamida et al. ........ 297/378.12 |

\* cited by examiner

*Primary Examiner*—Laurie K. Cranmer
(74) *Attorney, Agent, or Firm*—Ralph E. Smith

(57) ABSTRACT

A seat assembly arranged to pivot about a horizontal axis and capable of being repositioned between a forward seated position and a tailgate position. The assembly includes a first assembly including a pin. The assembly further includes a second assembly including a recliner link. The recliner link is arranged to engage or disengage the pin based on rotation of the seat assembly. Engagement of the pin with the recliner link locks the seat assembly into tailgate position and prevents the first assembly from inadvertently folding into a position parallel to said second assembly.

11 Claims, 4 Drawing Sheets

TAILGATE SEAT ASSEMBLY

TECHNICAL FIELD OF THE INVENTION

The present invention relates generally to seat assemblies for vehicles. More particularly, the invention relates to a tailgate seat assembly.

BACKGROUND OF THE INVENTION

Several designs are known in the art for providing a rearward seat in a vehicle that translates from a forward seated position to a so-called tailgate position. Such seats typically are positioned in a rearward portion of a vehicle, such as a minivan, to provide occupants the ability to sit in a rearward direction while the hatch of the vehicle is open when the seat is positioned in the tailgate mode. One design provides the ability to swing the seat about a transverse axis whereby a seatback portion of the seat in the seated position becomes a seat-bottom portion in the tailgate position. Likewise, the seat-bottom portion in the seated position becomes the seatback portion in the tailgate position. The design may further include a third position whereby the seat may be stowed.

One particular shortcoming associated with this particular seat design relates to the absence of a locking mechanism. In the tailgate position, the absence of a locking mechanism prevents the seat from being secured in the tailgate position thereby allowing the seat bottom portion of the seat to prematurely move between the upright position assumed when the seat is in tailgate position and folded position the seat bottom portion assumes to enable the seat to be placed in a stowed position. The premature assumption of the folded position is not desirable, particularly when an occupant is seated.

Therefore, it would be desirable to provide a seat assembly that overcomes the aforementioned and other disadvantages.

SUMMARY OF THE INVENTION

One aspect of the present invention provides a seat assembly arranged to pivot about a horizontal axis and capable of being repositioned between a forward seated position and a tailgate position. The assembly includes a first assembly including a pin. The assembly further includes a second assembly including a recliner link. The recliner link is arranged to engage or disengage the pin based on rotation of the seat assembly. Engagement of the pin with the recliner link locks the seat assembly into tailgate position and prevents the first assembly from inadvertently folding into a position parallel to said second assembly.

The foregoing and other features and advantages of the invention will become further apparent from the following detailed description of the presently preferred embodiments, read in conjunction with the accompanying drawings. The drawings are not to scale. The detailed description and drawings are merely illustrative of the invention, rather than limiting the scope of the invention being defined by the appended claims and equivalents thereof.

DETAILED DESCRIPTION OF THE PRESENTLY PREFERRED EMBODIMENTS

Figure 1:
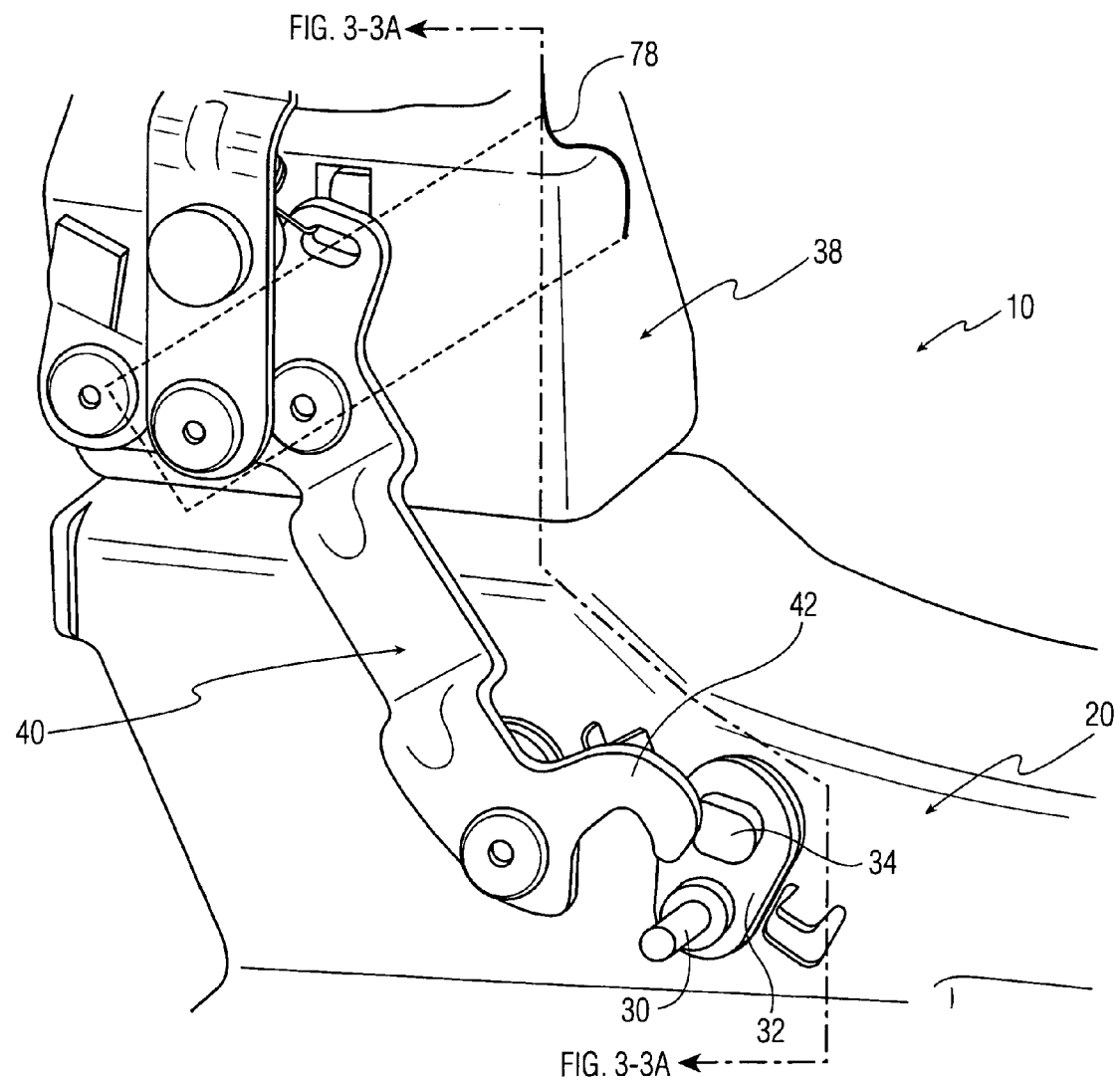
FIG. 1 is a detailed view of a seat assembly in accordance with one embodiment of the present invention wherein the seat assembly is shown in a forward seated position and a recliner link and a pin are shown in a disengaged position.
Figure 2:
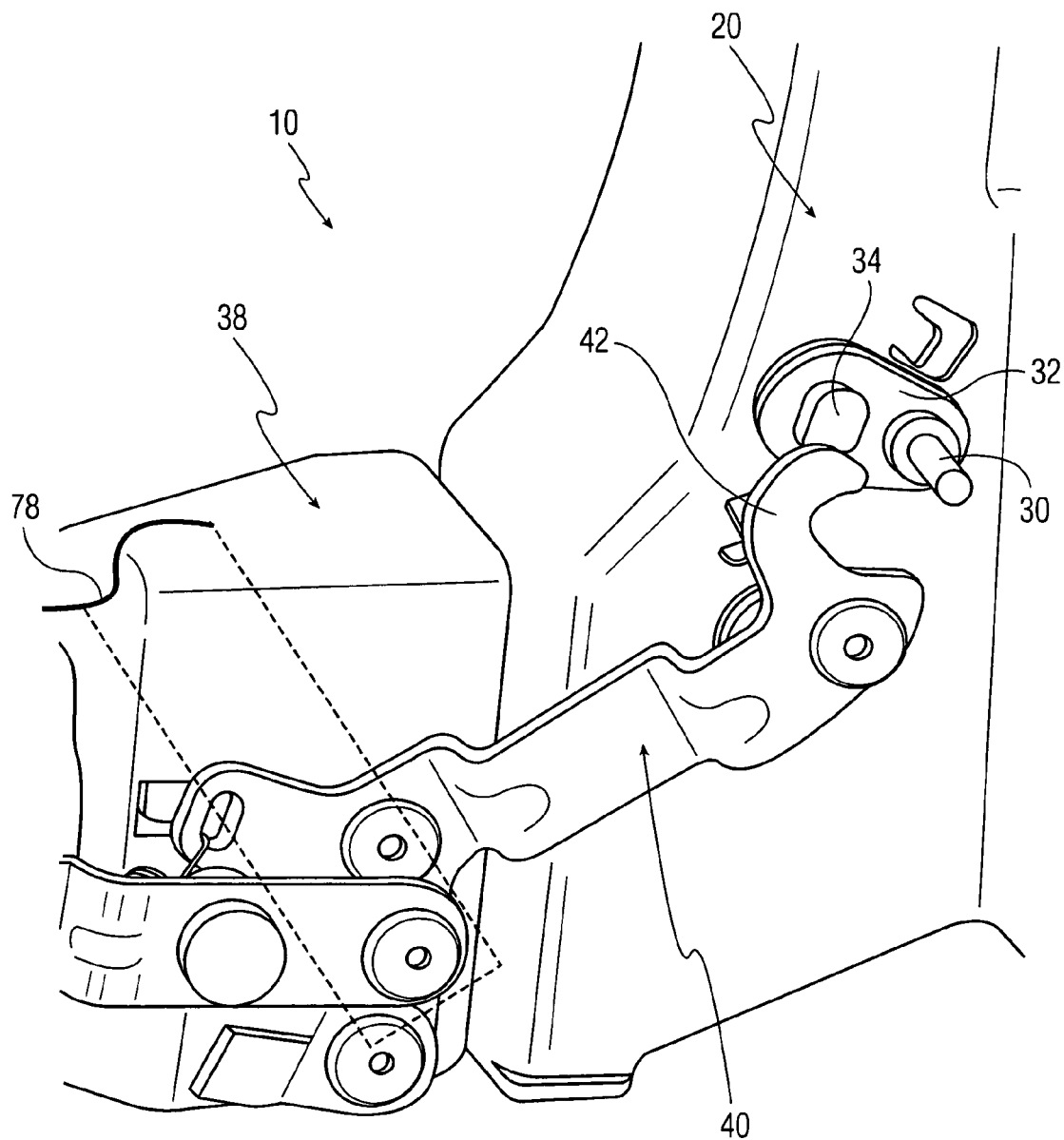
FIG. 2 is a view of the seat assembly shown in FIG. 1 wherein the seat assembly in shown in a tailgate position and the recliner link and pin are shown in an engaged position.
Figure 3:
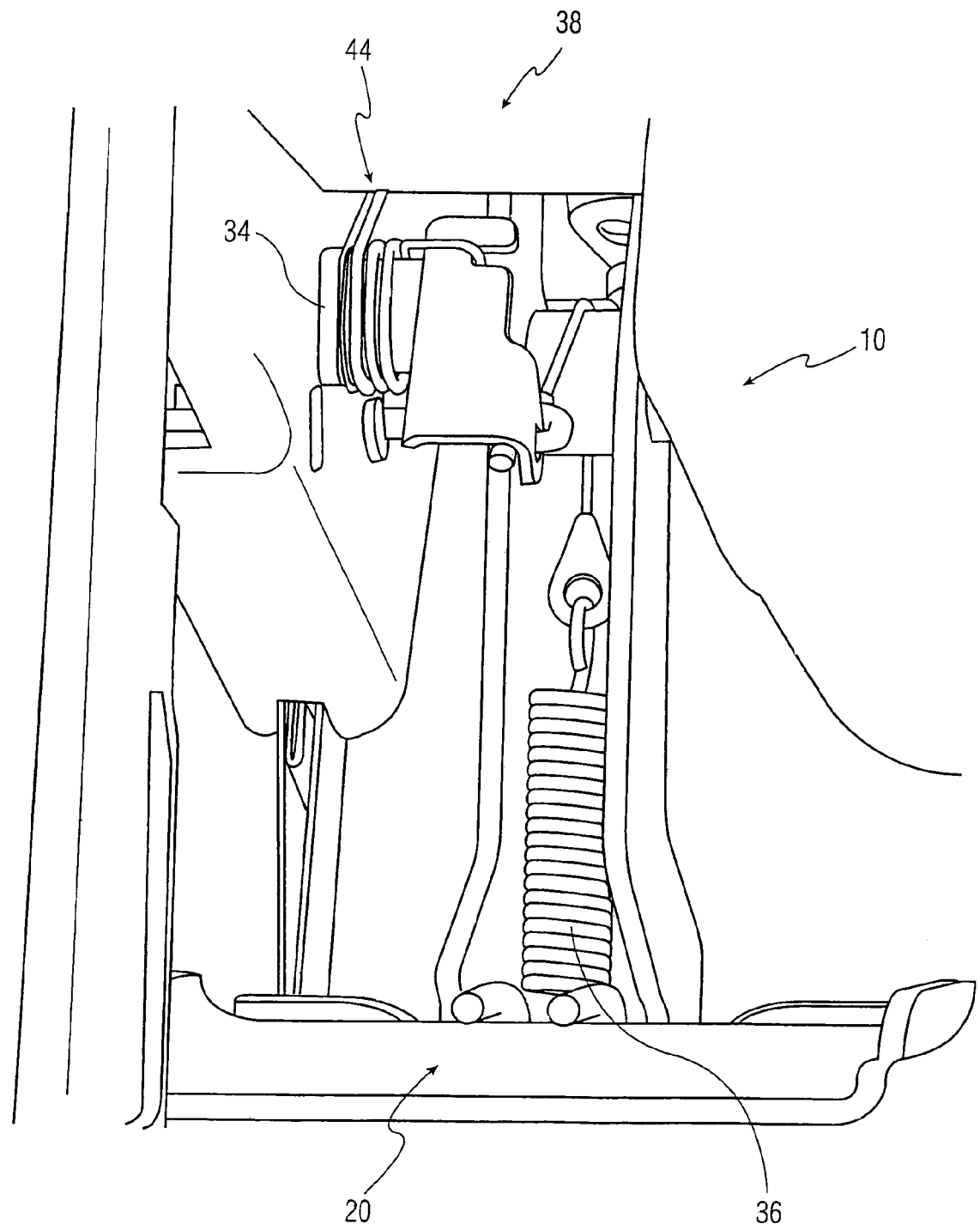
FIG. 3 is a detailed view of a cut-away of the seat assembly along sight line 3–3A as shown in FIG. 1.

Referring to the drawings, wherein like reference numerals refer to like elements, FIGS. 1, 2, and 3 are views of a seat assembly, shown generally by numeral 10, in accordance with one embodiment of the present invention. Seat assembly 10 includes a first assembly 20 including a pin 30. Seat assembly 10 further includes a second assembly 38 including a recliner link 40. Seat assembly 10 is repositionable between a forward seated position, shown in FIG. 4, and a tailgate position, shown in FIG. 5. Recliner link 40 and pin 30 are movable between a disengaged position, shown in FIG. 1, and an engaged position, shown in FIG. 2, based on rotation of the seat assembly 10. Those skilled in the art will recognize that the configuration of the seat assembly 10 may vary from the present description and figures. The inventors contemplate numerous modifications to the seat assembly 10 that may be adapted for use with the present invention.

Seat assembly 10 may be preferably attached to a rearward row of the vehicle. This position would allow the users to "tailgate", allowing the user to sit in a rearward direction while a hatch of the vehicle is open. Seat assembly 10 may be provided as a single seat or multiple seats placed side-to-side. In an exemplary embodiment, the vehicle may be a minivan. It should be appreciated by those skilled in the art that the assembly 10 is not limited to a minivan vehicle alone but may be adapted for use in various types of vehicles such as a truck, airplane, marine vessel, and the like.

In an exemplary embodiment, shown in FIGS. 1–5, the first assembly 20, which includes the pin 30, may be a seat bottom portion 72. Seat bottom portion 72 may be operably attached to a floor portion 60 of the vehicle by a base assembly 50. The second assembly 30, which includes the recliner link 40, may be a seatback portion 74. Seat assembly 10 may be repositioned between the forward seated position and the tailgate position about seat pivot 76 shown in FIGS. 4 and 5. Seat assembly 10 may be folded about seat pivot 76 as is understood in the art. Specifically, the seat bottom portion 72 and seatback portion 74 may be brought into contact whereby they are virtually parallel one to another. Seat assembly 10 may be folded from either or both of the forward seated position and the tailgate position.

Seat assembly 10 may further assume a stowed position as understood in the art. Specifically, the seat assembly 10 may be repositioned within a storage area or cavity within the floor portion 60 of the vehicle to provide additional space within the vehicle. Seat assembly 10 may be stowed from either or both of the forward seated position and the tailgate position. Those skilled in the art will recognize that the seat assembly 10 may be repositioned in numerous ways and that the present invention is not limited by the examples provided herein.

Figure 4:
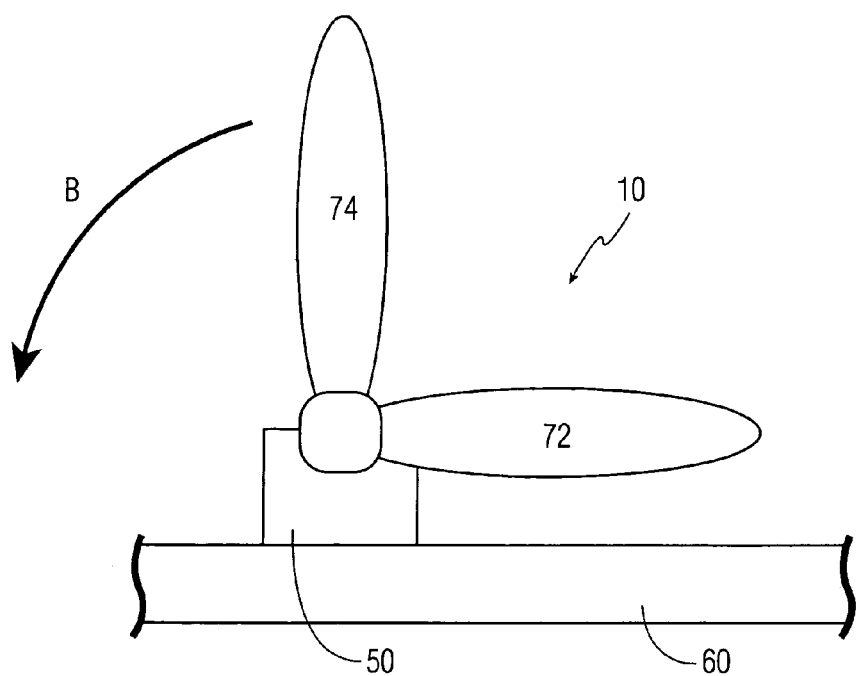
FIG. 4 is an alternative schematic view of the seat assembly shown in FIG. 1 wherein the seat assembly is shown in a forward seated position.
Figure 5:
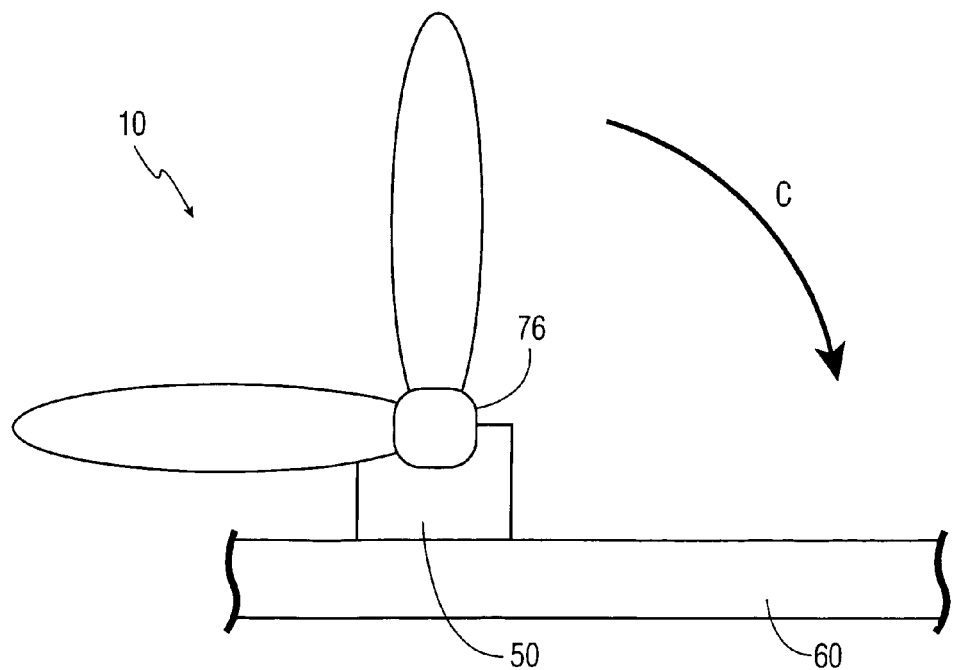
FIG. 5 is an alternative schematic view of the seat assembly shown in FIG. 4 wherein the seat assembly is shown in a tailgate position.

In the forward seated position, the recliner link 40 and pin 30 are in the disengaged position as shown in FIG. 1. In the disengaged position, the seat assembly 10 is free to move along arrow B from the forward seated position, which is shown in FIG. 4, to the tailgate position, which is shown in FIG. 5. Movement from the forward seated position to the tailgate position may be actuated by a release mechanism. The release mechanism may be a strap 78 operably attached to the seat assembly 10 that is activated by a manual pull action, an automatic mechanism (e.g., a motor), or another mechanism. In the tailgate position, the recliner link 40 and pin 30 are in the engaged position as shown in FIG. 2. In the engaged position, the seat assembly 10 is locked from repositioning from the tailgate position to the stowed position. Specifically, the pin 30 is in contact with the recliner link 40 thereby preventing the seat bottom portion 72 from rotating about seat pivot 76 beyond the tailgate position into a folded position such that the seat assembly 10 is capable of assuming the stowed position.

Recliner link 40 may include a flange portion 42 corresponding to the pin 30. Specifically, the flange portion may be U-shaped to receive a round pin 30. Pin 30 may be operably attached to the first assembly 20 with a cam 32. Cam 32 may rotate about a pivot 34 operably attached to the first assembly 20. Cam 32 may be biased into rotation by operation of either a spring 36 or a coil spring 44. In another embodiment, the bias may be provided by another mechanism capable of generating an appropriate force.

During repositioning of the seat assembly 10 from the forward seated position to the tailgate position (i.e., as the seat assembly 10 rotates about the seat pivot 76) the recliner link 40 may engage the pin 30. Specifically, the spring 36 may progressively bias the cam 32 into rotation (i.e., into a clockwise direction in FIGS. 1 and 2) concurrent with the rotation of the seat assembly 10 about the seat pivot 76. In one embodiment, the seat assembly 10 may be freely repositioned back into the forward seated position after it has been locked in the tailgate position. In another embodiment, the seat assembly 10 may include a tailgate release mechanism such as a second strap, a button, or the like to provide repositioning of the seat assembly 10 back into to the forward seated position.

The user may also reposition the seat assembly 10 from the tailgate position to the forward seating position through activation of a release mechanism, which in this case is the strap 78. During repositioning of the seat assembly 10 from the tailgate position to the forward seated position along arrow C, the recliner link 40 may disengage the pin 30 as a result of the user exerting a pulling force on the strap 78. Specifically, the coil spring 44 may progressively bias the cam 32 into rotation (i.e., into a counter-clockwise direction in FIGS. 1 and 2) concurrent with the rotation of the seat assembly 10 about the seat pivot 76.

While the embodiments of the invention disclosed herein are presently considered to be preferred, various changes and modifications can be made without departing from the spirit and scope of the invention. For example, the tailgate seat assembly configuration, and method of operating the same are not limited to any particular design or sequence. Specifically, the first assembly, second assembly, pin, recliner link, and method of operating the same may vary without limiting the utility of the invention. Those skilled in the art will recognize that the first assembly, which includes the pin, may conversely be a seat assembly and the second assembly, which includes the recliner link, may be a base assembly. The tailgate seat assembly of the second embodiment may function in a comparable manner to the seat assembly 10 with the exception of the positioning of the pin and recliner link. Those skilled in the art will further recognize that the positioning, shape, and mechanism of action of the recliner link and pin may vary and that such variations fall within the scope of the present invention Upon reading the specification and reviewing the drawings hereof, it will become immediately obvious to those skilled in the art that myriad other embodiments of the present invention are possible, and that such embodiments are contemplated and fall within the scope of the presently claimed invention. The scope of the invention is indicated in the appended claims, and all changes that come within the meaning and range of equivalents are intended to be embraced therein.

The invention claimed is:

1. A seat assembly arranged to pivot about a horizontal axis and capable of being repositioned between a forward seated position and a rearward seated-position comprising:
   a first assembly including a pin rotatably attached to one side of said first assembly;
   a second assembly including a recliner link attached to one side of said second assembly;
   said recliner link arranged to engage or disengage said pin based on rotation of the seat assembly, wherein engagement of said recliner link with said pin locks said seat assembly into said rearward seated position preventing said first assembly from inadvertently folding into a position parallel to said second assembly.

2. The assembly of claim 1 wherein the first assembly comprises a seat cushion assembly and the second assembly comprises a seatback assembly.

3. The assembly of claim 1 wherein the first assembly comprises a seatback assembly and the second assembly comprises a seat cushion assembly.

4. The assembly of claim 1 wherein the recliner link comprises a flange portion corresponding to the pin.

5. The assembly of claim 1 wherein the recliner link engages the pin as a result of repositioning of the seat assembly from the forward seated position to said rearward seated position.

6. The assembly of claim 1 wherein the recliner link disengages the pin as a result of repositioning of the seat assembly from the rearward seated position to the forward seated position.

7. The assembly of claim 1 wherein the pin is operably attached to the first assembly with a cam.

8. The assembly of claim 7 wherein the cam rotates about a pivot operably attached to the first assembly.

9. The assembly of claim 8 wherein the cam is biased into rotation.

10. The assembly of claim 9 wherein a spring provides the bias.

11. The assembly of claim 1 further comprising a release mechanism operably attached to the seat assembly, wherein activation of the release mechanism unlocks the seat assembly from the rearward seated position.

* * * * *

UNITED STATES PATENT AND TRADEMARK OFFICE
CERTIFICATE OF CORRECTION

PATENT NO. : 7,144,079 B2
APPLICATION NO. : 11/056374
DATED : December 5, 2006
INVENTOR(S) : Syrowik et al.

It is certified that error appears in the above-identified patent and that said Letters Patent is hereby corrected as shown below:

Title Page:

Item (73) Assignee: DaimlerChrysler Corporation, Auburn Hills, MI (US)

*Should also include:*

*Intier Automotive Inc., Newmarket, Ontario, (Canada)*

Signed and Sealed this

Twenty-second Day of July, 2008

JON W. DUDAS
*Director of the United States Patent and Trademark Office*